United States Patent Office 3,565,858
Patented Feb. 23, 1971

3,565,858
HEAT CONVERTIBLE ORGANOPOLYSILOXANE COMPOSITIONS
Wilfried Kniege, Bergisch-Gladbach, and Karl Schnurrbusch, Leverkusen-Steinbuechel, Germany, assignors to Farbenfabriken Bayer Aktiengesellschaft, Leverkusen, Germany, a corporation of Germany
No Drawing. Filed Aug. 15, 1968, Ser. No. 752,765
Claims priority, application Germany, Aug. 23, 1967,
F 53,310
Int. Cl. C08f 11/04
U.S. Cl. 260—46.5                    9 Claims

ABSTRACT OF THE DISCLOSURE

Compositions comprising linear organopolysiloxanes, which are to be converted into a solid elastic state by adding an organic peroxide and subsequent moulding and heating, can be improved according to the invention by a treatment which comprises the addition of certain compounds releasing nitrogen at elevated temperature, and heating the resultant mixture at the same time or later until these nitrogen compounds have been decomposed. Such treatment enables the composition to be converted without the extensive final heat-treatment of the moulded articles, which is necessary in the procedure hitherto known in the art.

---

This invention relates to an improvement of organopolysiloxane compositions which are convertible into the solid elastic state by heating.

As is known, such compositions comprise linear organopolysiloxanes of the empirical formula $$R_nSiO_{\frac{4-n}{2}}$$

in which each R is a Si-linked alkyl, alkenyl, aryl, haloalkyl, haloaryl, cyanoalkyl or hydroxyl radical or a hydrogen atom, and $n$ has a value between 1.95 and 2.01, and usually comprise fillers, processing auxiliaries, pigments and cross-linking agents, the latter generally being organic peroxides. In order to transform such compositions into elastic products, they are heated in a mould for some minutes, for example 10 to 15 minutes at 150 to 170° C., the shaped articles becoming sufficiently dimensionally stable to enable them to be released from the mould. In order to attain the optimum properties of the elastic products with regard to relaxation and chemical stability, subsequent heating in the air at temperautres of about 200° C. for several hours is necessary.

This extensive after-treatment is a substantial economic disadvantage of the process of production and cannot be carried out at all in some cases for technical reasons, for example, when large vessels are internally coated or long rolls covered.

In order to avoid this subsequent heat-treatment it has already been proposed, for example in U.S. patent specification No. 3,341,489 to admix silanes containing olefinic substituents with organopolysiloxanes also containing olefinic substituents. However, these silanes gradually decompose in such mixtures so that the desired effect of their use continuously decreases with the duration of the storage of the mixtures.

It has now been found that the disadvantages described above may be avoided by providing, in order to produce a storable organopolysiloxane moulding composition convertible into solid elastic shaped articles and coatings after admixing therewith cross linking agents which act when heated, a composition which comprises a substantially linear polysiloxane of the empirical formula $$R_nSiO_{\frac{4-n}{2}}$$

in which each R is an alkyl, alkenyl, aryl, haloalkyl, haloaryl, cyanoalkyl or hydroxyl radical or a hydrogen atom, at least half of all radicals R are methyl radicals and $n$ has a value between 1.95 and 2.01, and which comprises 0.1 to 5 percent, by weight of the organopolysiloxane, of an additive which is N,N' - dimethyl-N,N'-dinitrosoterephthalamide, azodicarboxamide, benzene-sulphohydrazide or benzene-disulphohydrazide or a mixture of any thereof.

The additive may be incorporated in the composition before, during or after the mixing of the polysiloxane with any other constituents of the composition, for example the fillers conventionally used and any pigments or auxiliary agents. During or after the addition of the additive the composition has to be heated at at emperature above the decomposition temperature of the additive, preferably at a temperature betwen 150 to 200° C., until this additive is decomposed, releasing nitrogen.

The composition may be prepared in the simplest way in any of the apparatus, customary in the rubber industry, provided with heatable rollers, between which the intimate mixing of the compositions and their heat-treatment takes place at the same time. Alternatively, the mixture may also first be prepared at room temperature followed by heating. The admixture of a cross-linking agent required before moulding must obviously be carried out after cooling the composition. The moulding may be carried out under pressure and with heating in a vulcanizing press.

An after-treatment in hot air of the shaped articles and coatings produced in this way is surprisingly no longer necessary. A clear explanation for this phenomenon cannot be given for the time being; it may be assumed that the success of the process is due to a prevention of the oxidative action of air during the mixing process, although the replacement of the nitrogen compounds to be used according to the invention by a nitrogen atmosphere which can only provided in closed mixing devices, does not lead to the desired result.

In connection with the production of elastomers, additives generating nitrogen upon heating have hitherto been used only to expand the elastomers with the formation of a foam- or sponge-like structure and it is known that, in contradistinction to the process according to the invention, the heating of the mixture inducing the gas-generating decomposition must only take place after moulding and with the simultaneous course of the cross-linking reaction.

The following examples illustrate the invention.

EXAMPLE 1

By means of a conventional rolling device there are mixed, at a rolling temperature of 160° C., 100 parts by weight of a polydiorganosiloxane prepared in known manner by equilibration of a mixture (containing a catalytic amount of potassium hydroxide) of octamethyl-cyclotetrasiloxane and tetramethyl-tetravinyl cyclotetrasiloxane in a proportion by weight of 500:1, with 3 parts by weight N,N'-dimethyl-N,N' - dinitroso-terephthalamide and also with 30 parts by weight of a finely divided silica, 2 parts by weight diphenylsilane-diol and 2 parts by weight titanium dioxide.

The resultant organopolysiloxane composition is stored at room temperature for 2 days, then mixed in known manner with 0.6 part by weight of a 96% dicumyl peroxide, subsequently it is moulded in a vulcanizing press and cured therein under pressure and with heating at 170° C. for 10 minutes.

EXAMPLES 2, 3 AND 4

The dimethyl-dinitroso-terephthalamide used in Example 1 is replaced by 3 parts by weight azo-dicarboxamide (2), benzene-sulphohydrazide (3) or benzene-disulphohydrazide (4). Otherwise the process is carried out as described in Example 1.

The mechanical properties of the moulded articles obtained according to Examples 1 to 4 were tested according to the appropriate German Standard Specifications (DIN) and also the product of a control experiment where the admixture of a component splitting off nitrogen was omitted.

The test results are set out in the table below. For further comparison, there are added in brackets the test values of moulded articles which were obtained in a second series of tests where the production of the moulded articles described was followed by a further heat-treatment at 200° C. for 15 hours in the air.

|  | Hardness (Shore A) | Tensile strength (kg./cm.²) | Elongation, percent | Compression, set percent |
|---|---|---|---|---|
| Comparison | 45 (55) | 80 (70) | 370 (270) | 56 (25) |
| Example 1 | 54 (54) | 70 (71) | 270 (275) | 28 (26) |
| Example 2 | 55 (55) | 72 (72) | 280 (280) | 27 (25) |
| Example 3 | 53 (53) | 73 (71) | 290 (295) | 28 (26) |
| Example 4 | 52 (52) | 70 (70) | 270 (270) | 28 (27) |

EXAMPLES 5 TO 11

There are used in the table below the parts by weight indicated as "additional amount" of N,N'-dimethyl-N,N'-dinitrosoterephthalamide, instead of the amount mentioned in Example 1, otherwise proceeding as there described.

The testing of the mechanical properties of the moulded articles produced in this manner resulted in the following test values (in brackets: values of the after-heated moulded articles in analogy with the preceding examples):

| Example | Additional amount | Hardness (Shore A) | Tensile strength (kg./cm.²) | Elongation, percent | Compression set, percent |
|---|---|---|---|---|---|
| 5 | 0.1 | 50 (55) | 75 (70) | 310 (270) | 36 (25) |
| 6 | 0.2 | 52 (55) | 73 (70) | 280 (275) | 28 (26) |
| 7 | 0.5 | 53 (55) | 70 (70) | 270 (270) | 27 (25) |
| 8 | 1 | 54 (54) | 70 (70) | 275 (275) | 27 (26) |
| 9 | 2 | 54 (54) | 70 (70) | 270 (275) | 28 (26) |
| 10 | 4 | 53 (53) | 70 (69) | 275 (270) | 28 (26) |
| 11 | 5 | 52 (52) | 52 (68) | 260 (270) | 29 (28) |

What is claimed is:

1. An organopolysiloxane composition comprising substantially linear polysiloxanes of the empirical formula $$R_nSiO_{\frac{4-n}{2}}$$

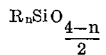

in which each R is an alkyl, alkenyl, aryl, haloalkyl, haloaryl, cyanoalkyl or hydroxyl radical or a hydrogen atom, at least half of all radicals R are methyl radicals and $n$ has a value between 1.95 and 2.01, and comprising from 0.1 to 5%, by weight of the orianopolysiloxane, of an additive selected from the group consisting of N,N'-dimethyl-N,N'-dinitrosoterephthalamide, azodicarboxamide, benzene-sulphohydrazide, benzene-disulphohydrazide, and a mixture of any thereof.

2. In a process for the production of a storable organopolysiloxane composition convertible into the solid elastic state by heating when admixed with a cross-linking agent, said composition comprising a substantially linear polysiloxane of the empirical formula $$R_nSiO_{\frac{4-n}{2}}$$

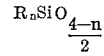

in which each R is an alkyl, alkenyl, aryl, haloalkyl, haloaryl, cyanoalkyl or hydroxyl radical or a hydrogen atom, at least half of all radicals R are methyl radicals and $n$ has a value between 1.95 and 2.01, the improvement which comprises incorporating in said composition 0.1 to 5 percent, by weight of said linear polysiloxane, of a nitrogen compound selected from the group consisting of N,N'-dimethyl-N,N'-dinitrosoterephthalamide, azodicarboxamide, benzene-sulphohydrazide, benzene-disulphohydrazide, and a mixture of any thereof, and heating, after commencement of said incorporation, the resulting composition to a temperature of 150 to 200° C. until said nitrogen compound is decomposed.

3. The process of claim 2 in which the incorporation of said nitrogen compound is carried out simultaneously with the aforesaid heating.

4. Process of producing a solid elastic organopolysiloxane polymer which comprises producing a storable organopolysiloxane composition by the process of claim 2, employing said polysiloxane and said nitrogen compound, admixing the storable organopolysiloxane composition with a crosslinking agent and heating to convert the last-mentioned admixture to said solid elastic organopolysiloxane polymer.

5. Process according to claim 4, wherein the crosslinking agent is an organic peroxide.

6. Process according to claim 2, said nitrogen compound being N,N' - dimethyl-N,N'-dinitrosoterephthalamide.

7. Process according to claim 2, said nitrogen compound being azodicarboxamide.

8. Process according to claim 2, said nitrogen compound being benzene-sulphohydrazide.

9. Process according to claim 2, said nitrogen compound being benzene-disulphohydrazide.

References Cited

UNITED STATES PATENTS

| 2,704,748 | 3/1955 | Pfeifer | 260—37 |
| 2,713,564 | 7/1955 | Pfeifer et al. | 260—37 |
| 2,789,155 | 4/1957 | Marshall et al. | 174—120 |
| 2,877,211 | 3/1959 | Nitzsche et al. | 260—46.5 |
| 3,127,363 | 3/1964 | Nitzsche et al. | 260—18 |
| 3,183,205 | 5/1965 | Bailey et al. | 260—37 |
| 3,234,175 | 2/1966 | Pike | 260—37 |
| 3,341,489 | 9/1967 | Simpson | 260—37 |

HOSEA E. TAYLOR, Primary Examiner

M. I. MARQUIS, Assistant Examiner

U.S. Cl. X.R.

260—2.5, 37